United States Patent [19]

Ellis

[11] 4,000,753

[45] Jan. 4, 1977

[54] MEANS FOR LOCKING REPLACEABLE NOZZLES TO FIRE HYDRANTS

[75] Inventor: Daniel A. Ellis, Decatur, Ill.

[73] Assignee: Mueller Co., Decatur, Ill.

[22] Filed: July 29, 1975

[21] Appl. No.: 600,191

[52] U.S. Cl. .................................. 137/296; 151/8; 285/90; 403/320

[51] Int. Cl.² .......................................... E03B 9/04

[58] Field of Search ....... 285/90, 91; 151/8, 54–57; 403/320, 356; 137/296

[56] References Cited

UNITED STATES PATENTS

| 134,990 | 1/1873 | Hood | 151/57 |
|---|---|---|---|
| 991,559 | 5/1911 | Symons | 137/283 |
| 3,212,796 | 10/1965 | Neuschotz | 285/91 |
| 3,408,094 | 10/1968 | Flachbarth et al. | 285/90 |
| 3,534,941 | 10/1970 | Dunton | 251/360 |
| 3,677,282 | 7/1972 | Page | 137/283 |

*Primary Examiner*—Martin P. Schwadron
*Assistant Examiner*—Richard Gerard
*Attorney, Agent, or Firm*—Cushman, Darby & Cushman

[57] ABSTRACT

A fire hydrant either of the "wet" barrel type or the "dry" barrel type having an improved hydrant nozzle construction. The barrel of the fire hydrant is provided with an internally threaded boss for receiving a replaceable externally threaded nozzle. Means for locking the nozzle to the boss of the barrel is provided so that the nozzle may not be removed by unauthorized personnel. Sealing means are provided between the nozzle and the boss of the barrel which can not lose its effectiveness due to cold flow and thus will not reduce the gripping effect of the nozzle to the barrel when the nozzle has been threaded therein with an initial torque.

10 Claims, 3 Drawing Figures

MEANS FOR LOCKING REPLACEABLE NOZZLES TO FIRE HYDRANTS

The present invention relates to improvements in fire hydrants and, more particularly, to an improved fire hydrant nozzle construction wherein the nozzle is threadably received in the fire hydrant barrel and may be removed, repaired and/or replaced. The nozzle once threaded into the fire hydrant barrel, is locked in place by means of a self-tapping screw inserted between the nozzle and the boss of the barrel on an axis parallel to the axis of the nozzle. Additionally, the present invention provides an improved sealing arrangement between the nozzle and the boss of the barrel whereby the sealing ring is completely encompassed by the two elements and does not have the tendency to cold flow in time and thus will not reduce the gripping effect of the nozzle to the barrel when the nozzle has been threaded therein with an initial torque.

BACKGROUND OF THE INVENTION

For many years fire hydrants of the "dry" barrel type have been constructed with a brass or bronze nozzle inserted into a boss provided on a barrel of the hydrant, the brass or bronze nozzle being permanently retained in the boss by calking with lead or the like. In this respect, the nozzles were provided with four inner locking lugs which were given a fractional turn from slots in the boss of the barrel when installed and then calked in place so that the nozzle could not be blown out with water pressure. The difficulty with this type of nozzle construction resulted when it was necessary to replace the nozzle due to damage of the nozzle or wear of the hose threads on the nozzle from use as it usually required the barrel to be removed and returned to the maintenance shop for the repairs or modification.

More recently hydrants have been constructed with replacement nozzles which could be replaced in situ merely by threading the nozzle out of the boss and replacing the nozzle with another nozzle. This does require a machining operation to the cast iron barrel and nozzle as the boss of the barrel and the nozzle respectively had to have threads interiorly and exteriorly machined thereon. However, this gave the hydrants considerable more utility in that the hydrants could be installed and when the situation occurred when it was necessary to change the hydrant nozzle because of damage to the same or because a community makes a change in size of hose connections, the nozzle could merely be unthreaded from the hydrant barrel and replaced so that effectively there was no interruption of service.

However, this arrangement of replaceable nozzles was not entirely satisfactory in that unauthorized personnel could remove the nozzles and thus the hydrant was not completely foolproof. To obviate this, radial holes were drilled through the barrel boss and into the nozzle and either a blind pin was radially inserted into the aligned holes or the hole in the boss was threaded and a threaded lock pin was inserted into the aligned holes. This arrangement, while functioning to prevent inadvertent removal of the nozzle, has a drawback when it was desired to replace the nozzle since it was difficult to get the holes to align when the nozzle was threaded back onto the hydrant or if a new nozzle was installed it required drilling of the new nozzle at the site of installation.

In prior installations utilizing a replaceable nozzle threaded into a boss into the hydrant barrel, an abutment flange was provided on the nozzle and a sealing ring was inserted between the abutment flange of the nozzle and the outwardly facing surface of the boss. After the nozzle had been inserted into the boss on the barrel at an initial torque, thus loading the sealing ring, in time the sealing ring would cold flow, reducing the gripping effect between the nozzle and the boss, thus making the removal of the nozzle easier and thus reducing the sealing effect of the sealing ring.

PRIOR ART

Prior art relating to fire hydrants and in particular to fire hydrant nozzle constructions having replaceable nozzles are as follows:

| NUMBER | NAME | DATE |
| --- | --- | --- |
| 991,559 | SYMONS | May 9, 1911 |
| 3,534,941 | DUNTON | October 20, 1970 |
| 3,677,282 | PAGE | July 18, 1972 |

BRIEF SUMMARY OF THE INVENTION

Broadly stated, the present invention relates to an improvement in a fire hydrant and more particularly to the improved nozzle construction for a fire hydrant having a replaceable nozzle.

While the present invention is disclosed as being used for the nozzle construction of a "dry" barrel type of fire hydrant wherein the main hydrant valve is located in or adjacent to the shoe of the hydrant and is beneath ground level, the present invention is also capable of use with the "wet" barrel hydrant wherein the hydrant barrel contains the main hydrant valve at or adjacent to the hydrant nozzle so that the hydrant barrel is at all times filled with water under pressure. Usually the nozzle for "wet" barrel fire hydrant contains the valve seat of the main hydrant valve.

The fire hydrant of the present invention includes a barrel having an outwardly extending boss, the boss having a bore therethrough terminating at its outer end portion in a counterbore. The bore of the boss is provided with interior threads on its inner end portion which terminate short of the counterbore and are arranged to receive the external threads on a replaceable nozzle. An outwardly and radially extending flange is provided on the replaceable nozzle intermediate its outer and inner end portions, the flange being arranged to be received in the counterbore. The flange of the hydrant has at least a portion of its peripheral surface spaced radially inwardly from the peripheral wall of the counterbore at a predetermined distance and the nozzle is provided with exterior threads on its inner end portion which mate with the interior threads in the bore of the boss. A self-tapping screw is inserted between the peripheral wall of the counter-bore and the portion of the peripheral surface of the flange spaced a predetermined distance therefrom the screw locking the nozzle to the boss so that it may not be removed by unthreading until the self-tapping screw had been removed.

The self-tapping screw has a thread root diameter which is greater than the predetermined distance between the peripheral wall of the counterbore and the portion of the peripheral surface of the flange so that there is an interference fit. The relative thread root diameter of the screw for a particular predetermined distance between the peripheral wall of the counterbore and the surface of the flange controls the amount of torque necessary to shear the screw in removing the nozzle from the hydrant incorrectly.

The present invention further contemplates providing sealing means between the boss of the barrel and the nozzle, the sealing means being totally encompassed by these members. By such a construction the flange of the nozzle is arranged to abut directly upon the boss of the hydrant when the nozzle of the hydrant barrel is properly threaded into place and, thus, the gripping effect caused by the initial torque applied to the nozzle for installation of the nozzle never reduces due to cold flow of the sealing ring.

DETAILED DESCRIPTION OF THE INVENTION

Figure 1:
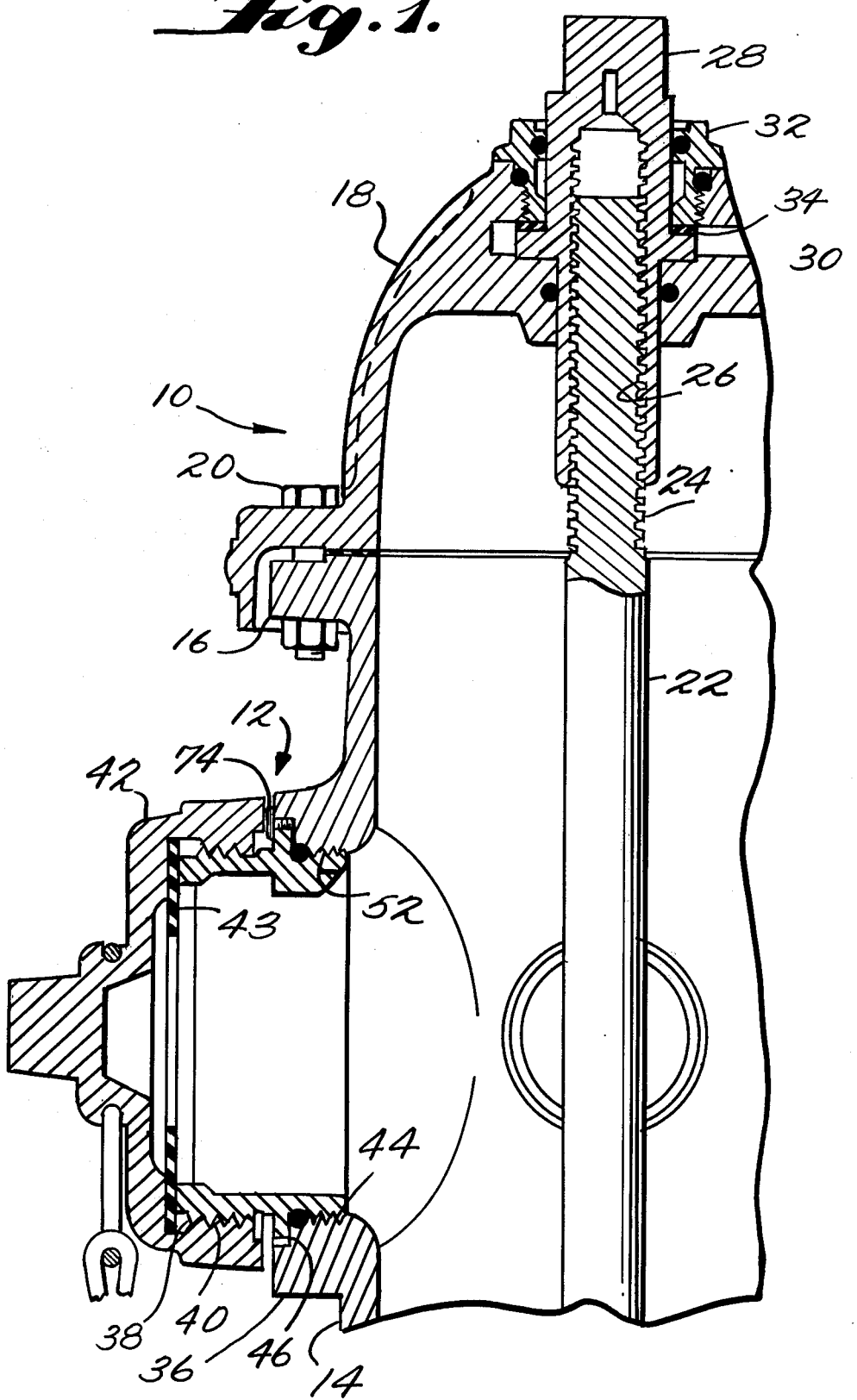
FIG. 1 is a fragmentary vertical sectional view of the upper portion of a fire hydrant illustrating the novel nozzle construction of the present invention.

Referring now to the drawings wherein like characters and reference numerals represent like or similar parts, there is disclosed in FIG. 1 a fragmentary view of the upper portion of a fire hydrant generally designated at 10, the view illustrating the novel nozzle construction as generally designated at 12. The lower portion of the fire hydrant 10 which includes the shoe and the main hydrant valve assembly may be of the type heretofore used in the art or it may be of the type as shown in the co-pending United States application Ser. No. 600,192 filed July 29, 1975 by Daniel A. Ellis and Joseph L. Daghe and entitled FIRE HYDRANT, this application and the aforementioned co-pending application being commonly assigned to Mueller Co., Decatur, Ill.

In more detail, the fire hydrant 10 includes the usual barrel 14 preferably made of cast iron having a flanged upper end 16 to which a bonnet 18 is bolted by a plurality of bolts 20. The hydrant is provided with a valve stem 22 having a threaded upper end 24 received in the interiorly threaded end 26 of an operating nut 28. The operating nut 28 which extends out of the bonnet 18 is provided with an outwardly and radially extending annular flange 30. A hold-down nut 32 bears against an anti-friction washer 34 and holds the operating nut 28 in position but permits the same to be rotated. The rotation of the operating nut 28 causes the valve stem 22 to reciprocate as is common in the art.

As is common practice with fire hydrant barrels, they are provided with one or more outwardly extending bosses 36 for reception of hydrant nozzles 38, which is preferably made of brass but could be made of bronze or other materials. The hydrant nozzle 38 is exteriorly threaded as indicated at 40 on its outer end portion for the reception of a nozzle cap 42. When the nozzle cap 42 with its cap gasket 43 is removed, the threads 40 function to receive a hose coupling for a fire hose or the like.

Figure 2:
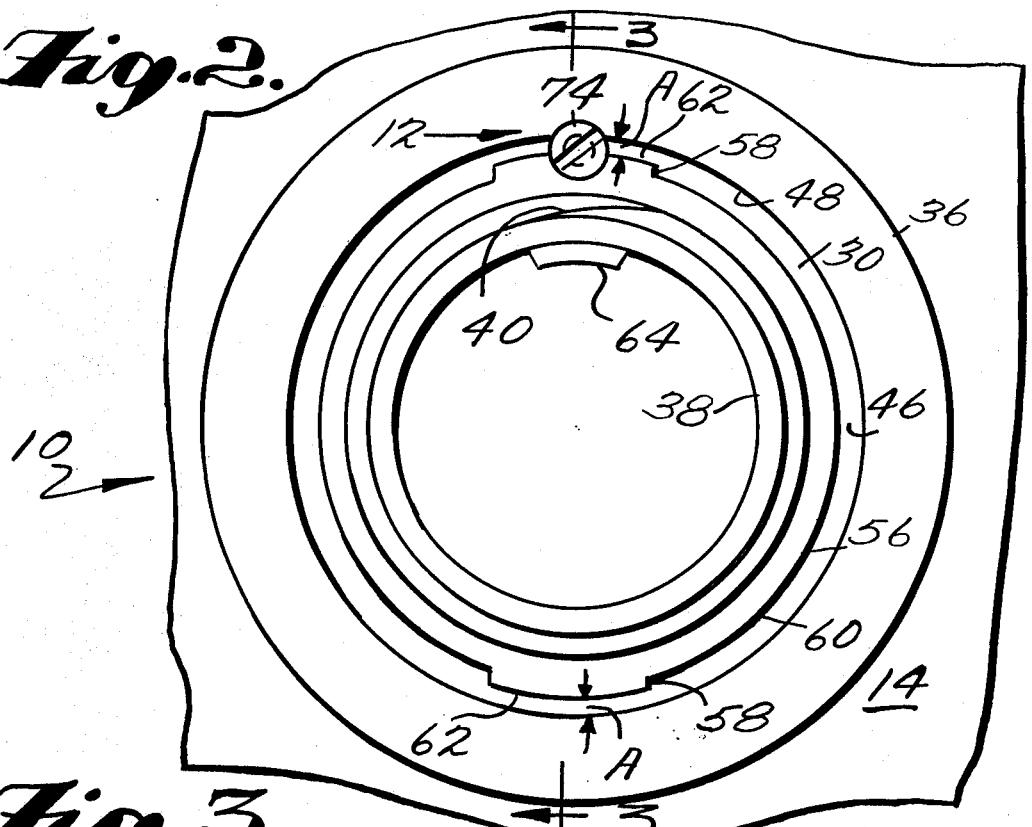
FIG. 2 is an enlarged end elevational view of the nozzle construction of FIG. 1, the view omitting the nozzle cap.
Figure 3:
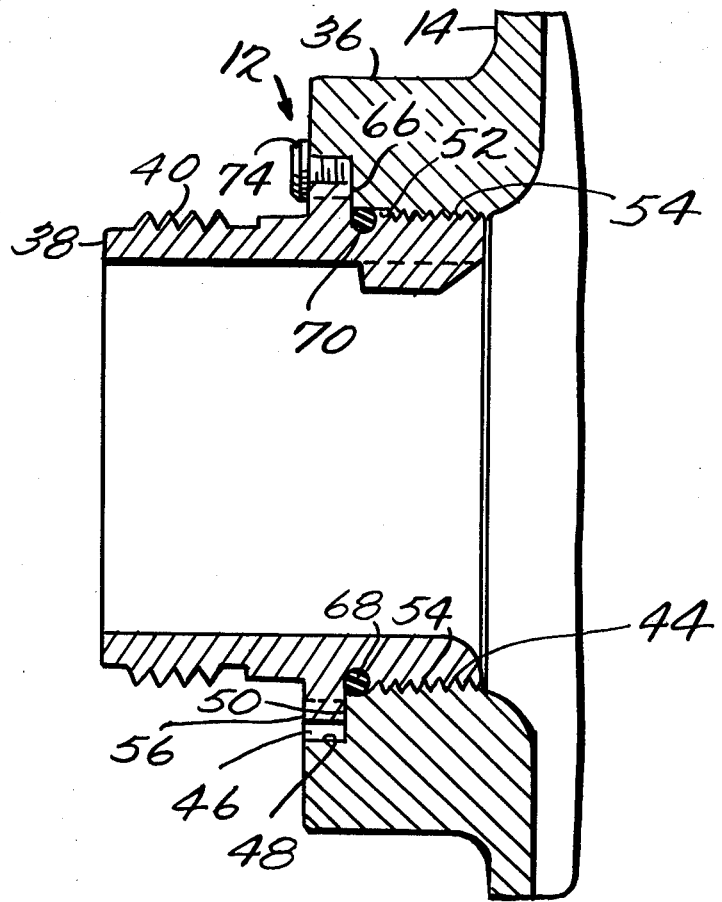
FIG. 3 is a sectional view taken on the line 3—3 of FIG. 2, the view better illustrating the improved nozzle construction.

Referring now to FIGS. 2 and 3 it will be noted that the boss 36 in the novel nozzle construction 12 of the present invention is provided with a bore 44 therethrough, the bore 44 terminating at its outer end portion in a counterbore 46. The counterbore 46 has a cylindrical peripheral wall 48 and an outwardly facing wall 50 lying in a radial plane of the nozzle. Additionally, the bore 44 of the boss 36 is provided with interior threads 52 on its inner end portion, the threads 52 terminating short of the counterbore 46.

The nozzle 38 of the present invention is provided on its inner end portion with exterior threads 54 which are adapted to mate with the threads 52 of the boss 36 and intermediate the exterior threads 40 and the exterior threads 54, the nozzle 38 is provided with an outwardly and radially extending flange 56. As best shown in FIG. 2, the flange 56 is generally cylindrical but is provided with at least one arcuate radially extending lug 58 so that the peripheral surface 60 of the flange 56 includes at least a peripheral surface portion 62 which is spaced closer to the peripheral wall 48 of the boss 36 than the remaining portion of the peripheral surface 60. The space between the peripheral surface portion 62 and the peripheral wall 48 of the boss 36 defines a groove.

The oppositely disposed arcuate lugs 58 serve two functions. First, these lugs 58 are utilized to receive a spanner wrench for insertion or removal of the nozzle 38 from the boss 36. Secondly, the distance A between the surface 62 of the flange 56 and the peripheral wall 48 of the counterbore 46 is accurately controlled at a predetermined distance for a particular function as will be explained in more detail later in the specification. The nozzle 38 is provided with an inwardly depending lug 64, this lug functioning as a locating means for the chuck used when the nozzle 38 is machined to provide the peripheral surface 62 and the threads 40 and 54 thereon.

The nozzle 38, intermediate the threads 54 and the inwardly facing surface 66 of the flange 56, is provided with an annular groove 68 which closely cooperates with the bore 44 of the boss 36. A sealing ring 70 is positioned in the annular groove 68 and it will be noted by reference to FIG. 3 that when the nozzle 38 is fully installed in the boss 36, the sealing ring 70 is completely encompassed between these two members. In this respect, the inwardly facing surface 66 of the flange 56 abuts directly against the outwardly facing radially extending wall 50 of the counterbore 46 so that there is a metal to metal bottoming of the nozzle 38 in the boss 36. By such an arrangement there is no opportunity for the sealing ring 70 to cold flow after a period of extended use and, consequently, the gripping effect caused by the torque utilized to install the nozzle 38 into the boss 36 never diminishes, as would be the case where a sealing ring or gasket is positioned between the flange 56 and the outwardly facing wall 50 of the counterbore 46.

As previously mentioned the distance A of the groove defined by the surface 62 of the flange 56 and the peripheral wall 48 of the counterbore 46 is accurately controlled at a predetermined distance because locking means are utilized between these two elements for locking the nozzle 38 to the boss 36 so that the nozzle can not be unthreaded unless the locking means is first removed. In more detail, a stainless steel self-tapping screw 74 is inserted into the groove defined by the surface 62 of the flange 56 and the peripheral wall 48 of the counterbore 46 on an axis parallel to the axis of the nozzle 38. The root diameter of the threads of the self-tapping screw 74 have a specific relationship to the radial width A of the groove between the surface 62 and the peripheral wall 48 of the counterbore 46 and this width broadly must be less than the root diameter of the threads of the screw so that when the screw is inserted there is an interference fit between the boss 36, the self-tapping screw 74 and the nozzle 38. When this occurs, it requires a large number of inch pounds of torque to cause the nozzle 38 to shear the screw 74 and permit removal of the nozzle. Of course, the self-tapping screw 74 can be removed by unthreading and then the nozzle 38 may be easily turned and removed from the boss 36 as only the usual unthreading torque is required. The screw head of the self-tapping screw 74 may be provided with the usual slot therein for reception of a screw driver or the screw head may be a Phillips screw head or a screw head having a hole of irregular shape requiring other special tools for unthreading.

In order to more clearly emphasize the relationship of the root diameter of the threads of the screw 74 to the width A of the groove between the surface 62 and the wall 48, a series of tests were run wherein the stainless steel self-tapping screw was a No. 8-32 Type F self-tapping screw of the type found in standards set by ANSI (American National Standard Institute) B18.6.4, 1965 draft revision of standards. The Type F self-tapping screw had a root diameter of 0.151 inches to 0.152 inches and according to ANSI standards, the recommended hole size for such a screw where it was screwed into two sheets of metal or the like is 0.147 inches. In the tests, the Type F screw was used to retain the nozzle 38 in the boss 36 with different groove widths A. In each instance, the nozzle 38 was initially threaded into the bore of the boss 36 with 0 inch pounds of torque so that in effect there was just an abutting relationship between the flange 56 of the nozzle 38 and the wall 50 of the counterbore 46. The Type F stainless steel self-tapping screw 74 was then inserted in each instance and the torque necessary to remove the nozzle 38 from the boss 36 by shearing the screw 74 was measured. The results of these tests are shown in the following table:

NOZZLE INSTALLED INTO BARREL BOSS WITH 0 INCH POUNDS TORQUE AND LOCKED WITH A NO. 8-32 STAINLESS STEEL TYPE F SELF-TAPPING SCREW

|  | ANNULAR GROOVE WIDTH | APPROXIMATE REMOVAL TORQUE |
|---|---|---|
| NOZZLE 1 | .080 INCHES* | 4,000 inch pounds |
| NOZZLE 2 | .090 INCHES | 2,600 inch pounds |
| NOZZLE 3 | .100 INCHES | 2,000 inch pounds |
| NOZZLE 4 | .147 INCHES (recommended hole size) | 200 inch pounds |

*SCREW DRIVEN IN PLACE BY HAMMER

It will be noted from the above table that for a groove width A of 0.080 inches, the screw 74 was driven in place with a hammer. In this situation, it was found that the self-tapping screw 74 could not be threaded into position between the cast iron boss 36 of the barrel 14 and the brass nozzle 38 as the threads were not formed in the brass lug 58 as they would strip on formation. However, when the self-tapping screw 74 was driven into position with a hammer, it could still be threadably removed and this particular arrangement offered excellent locking properties.

From the above, it was apparent that the locking means for locking the threaded nozzle 38 into the boss 36 has great utility because when it is desired, the nozzle 38 may be replaced in situ. The operation does not require any drilling of holes when replacing the nozzle or even to attempt to realign the nozzle and boss in the exact position they were in prior to its removal. In this respect, the self-tapping screw 74 may be placed between the surface 62 and the wall 48 of the oppositely disposed lug 58 or, for that matter, it may be replaced at a different angular position relative to the lug 62 in which it was initially threaded.

The terminology used in this specification is for the purpose of description and not limitation, as the scope of this invention is defined by the claims.

What is claimed is:

1. In a fire hydrant:
    a barrel having an outwardly extending boss, said boss having a bore therethrough terminating at its outer end portion in a counterbore having a peripheral wall and an outwardly facing radial wall, said bore having interior threads on its inner end portion terminating short of said counterbore;
    a replaceable nozzle having an outwardly and radially extending flange intermediate its outer and inner end portions and arranged to be received in said counterbore, said flange having at least a portion of its peripheral surface spaced radially inwardly a predetermined distance from the peripheral wall of said counterbore, said nozzle having exterior threads on its inner end portion for receiving the interior threads of said boss; and,
    a self-tapping screw inserted between the peripheral wall of said counterbore and the portion of the peripheral surface of said flange spaced a predetermined distance from the peripheral wall for locking said nozzle to said boss.

2. A fire hydrant as claimed in claim 1 in which said self-tapping screw has a thread root diameter greater than said predetermined distance between the peripheral wall of said counterbore and the at least said portion of the peripheral surface of said flange.

3. A fire hydrant as claimed in claim 1 in which said self-tapping screw has a thread root diameter which has an interference fit with the peripheral wall of said counterbore and the at least said portion of the peripheral surface of said flange.

4. A fire hydrant as claimed in claim 1 in which said predeterminded distance between the peripheral wall of said counterbore and the at least said portion of the peripheral surface of said flange is less than a recommended hole size for said self-tapping screw.

5. A fire hydrant as claimed in claim 1 in which said self-tapping screw is stainless steel.

6. A fire hydrant as claimed in claim 5 in which said hydrant barrel and said boss are made from a different material than said nozzle.

7. A fire hydrant as claimed in claim 6 in which said hydrant barrel and said boss are made of cast iron and in which said nozzle is made of brass.

8. A fire hydrant as claimed in claim 7 in which said predetermined distance between the peripheral wall of said counterbore and the at least said portion of the peripheral surface of said flange is less than the thread root diameter of said self-tapping screw to an extent which requires said self-tapping screw to be driven in place, said self-tapping screw being capable of being threadedly removed.

9. A fire hydrant as claimed in claim 7 in which said predetermined distance between the peripheral wall of said counterbore and the at least said portion of the peripheral surface of said flange is less than the thread root diameter of said self-tapping screw but great enough to permit said self-tapping screw to be threaded into position.

10. A fire hydrant as claimed in claim 1 and in which said nozzle has a peripheral groove between said exterior threads and said flange, and including an annular sealing ring in said groove and completely encompassed by said nozzle and said boss when the flange of said nozzle abuts the outwardly facing radial wall of said boss.

* * * * *